United States Patent [19]

Harper

[11] Patent Number: 5,765,165

[45] Date of Patent: Jun. 9, 1998

[54] FAST METHOD OF DETERMINING DUPLICATES ON A LINKED LIST

[75] Inventor: James Harper, Colorado Springs, Colo.

[73] Assignee: Sun Microsystems, Inc., Palo Alto, Calif.

[21] Appl. No.: 609,080

[22] Filed: Feb. 29, 1996

[51] Int. Cl.[6] .................................................. G06F 17/30
[52] U.S. Cl. ........................ 707/104; 707/102; 707/100
[58] Field of Search .................................... 395/611, 612, 395/613, 615; 707/104, 102, 100

[56] References Cited

U.S. PATENT DOCUMENTS

| | | | |
|---|---|---|---|
| 4,761,737 | 8/1988 | Duvall et al. | 395/419 |
| 5,347,652 | 9/1994 | Epstein et al. | 395/601 |
| 5,454,101 | 9/1995 | Mackay et al. | 395/603 |
| 5,485,566 | 1/1996 | Rahgozar | 395/770 |
| 5,519,840 | 5/1996 | Matias et al. | 395/612 |
| 5,551,026 | 8/1996 | Kaplan et al. | 395/611 |
| 5,584,006 | 12/1996 | Reber et al. | 395/427 |
| 5,611,076 | 3/1997 | Durflinger et al. | 395/613 |
| 5,619,723 | 4/1997 | Jones et al. | 395/823 |

OTHER PUBLICATIONS

Horowitz et al, Fundamentals of Data Structure, Computer Science Press, 1976, pp. 465–467, Dec. 31, 1976.

*Primary Examiner*—Wayne Amsbury
*Attorney, Agent, or Firm*—McDermott, Will & Emery

[57] ABSTRACT

Methods and computer program products are disclosed for improving the performance of hardware and software in which checking for duplicates on a linked list is required. In one form, a linked list is checked in its entirety for the presence of duplicates. In another, an element to be added to the linked list is checked to determine whether a duplicate of that element exists on the linked list.

19 Claims, 12 Drawing Sheets

FAST METHOD OF DETERMINING DUPLICATES ON A LINKED LIST

BACKGROUND OF THE INVENTION

1. Field of the Invention

This invention relates generally to improvements in computer systems and processes used for handling linked lists and more specifically to a system for utilizing a hash function to speed up the average search for duplicates in a linked list.

2. Description of Related Art

A large number of computer systems in the world run the UNIX operating system. The UNIX operating system contains a UNIX file system. There are three major parts to every file in the UNIX file system.

The first is the inode. Each file in the UNIX file system is described by a data structure called an inode. Inodes are located in special information blocks not used for data and each block typically contains a plurality of inodes. The inode contains all the information about a file except the file name and the actual data contained in the file. The disk addresses (locations on disk) for a file's information blocks are contained in the inode area. Inodes are numbered from 2 (reserved from the root directory) through $2^{31}$. This identifying number is known as the inode number or the i number.

The inodes serve as pointers to the actual physical file blocks on disk containing the file data.

The second component of the UNIX file system are the data blocks. Data blocks are located on disk and contain the actual data of a file. Each block can typically hold 4,096 characters although some UNIX implementations use larger block sizes.

The third component of a UNIX file system is the directory. A directory contains one or more file names. Each entry in a directory contains one file name and the inode number that points to the inode for the file. Directories also have an inode.

Figure 1:
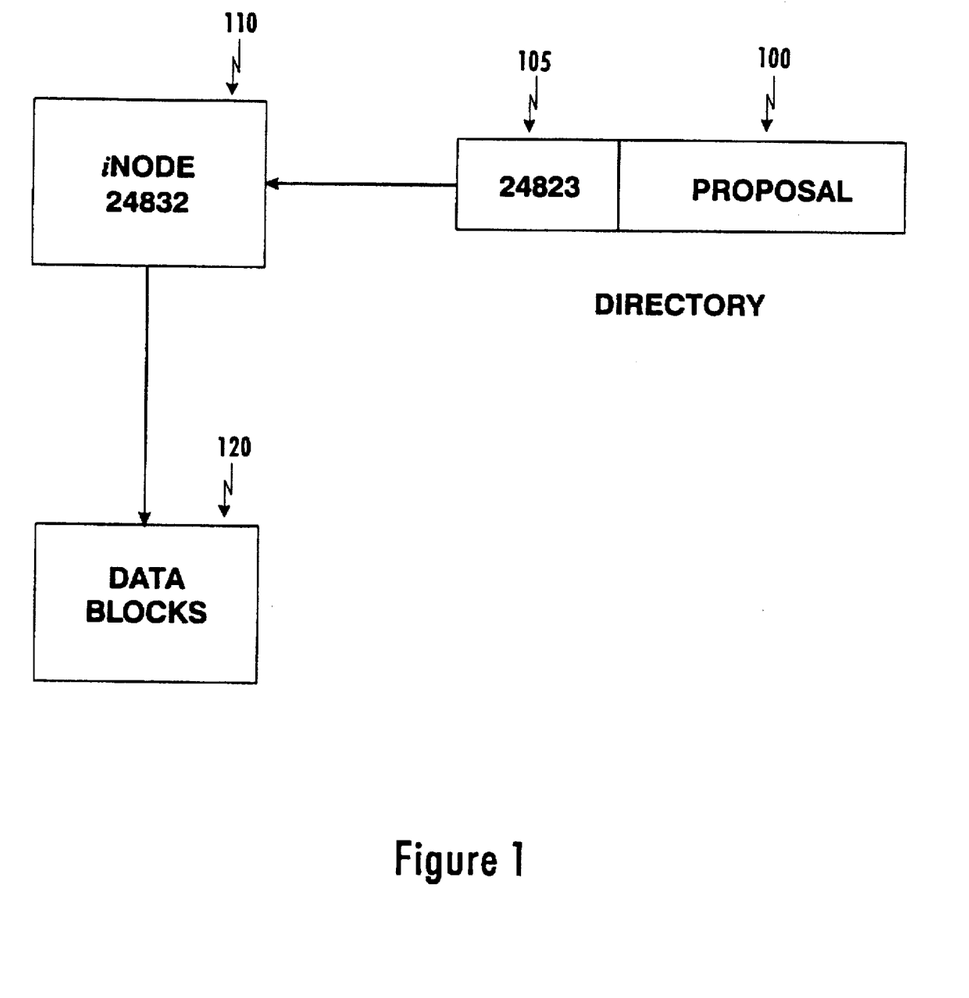
FIG. 1 illustrates the relationship between the data blocks of a file, the inode of a file, and a directory that references the file.

FIG. 1 illustrates the relationship between the data blocks, the inode, and a directory that references the file. In FIG. 1, the file name "proposal" is associated with an inode number pointing to the inode containing information about the file "proposal." The inode number "248231" points to inode 24823 which contains information about the file "proposal" such as when the file was created, and when it was last modified. The inode points to data blocks. The data blocks contain the actual characters in the file such as the textual contents of the "proposal" after which the file was named.

In simple sequential storage schemes for data structures, a problem exists when a data structure is to be added at a point intermediate to other data structures (that is, not at the end of the list). Either the structures before the insertion point or those after the insertion point must be moved to create storage space for the new element so that the sequential ordering can be maintained. Moving data is, of course, costly in terms of machine cycles and is not desired. One solution to the problem of data movement is to utilize, instead of sequential representations, linked representations. Unlike a sequential storage scheme where successive items of a list are located a fixed distance apart in memory, data structures stored in a linked representation may be placed anywhere in memory. In a sequential representation, the order of elements is the same as the order in which elements appear in memory. However, in a linked representation, the order of consecutive data structures are not necessarily located adjacent to each other in memory. To ensure access to elements of a linked list in the correct order, each element is stored with a pointer to the address or location of the next element in the list. Thus, associated with each data item or data structure in the linked representation is a pointer to the next item. This pointer is often referred to as a link. FIG. 2B illustrates a node of a linked list such as one shown in FIG. 2A. The first node of the linked list, traditionally, is referred to as the home node and generally contains no data entries. Thus, in FIG. 2A, node 1 is the home node for the linked list shown.

Figure 2A:
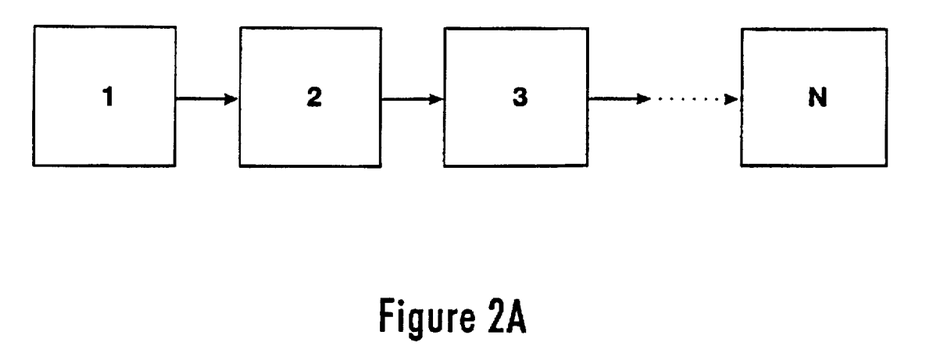
FIG. 2A illustrates a single linked list.
Figure 2B:
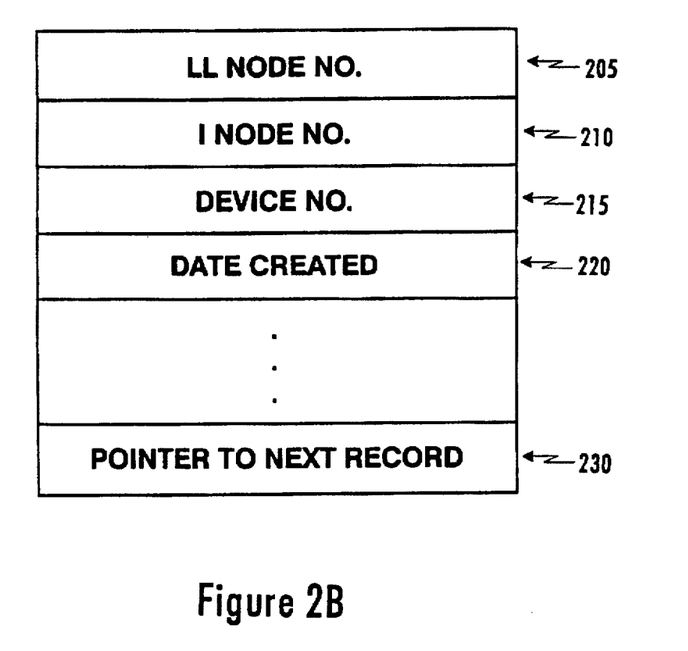
FIG. 2B illustrates a node of a single linked list.

FIG. 2B shows an abbreviation of an inode suitable for use with a single linked list as shown in FIG. 2A. Typical fields for such an inode include LL node no. 205, inode no. 210, device number 215, date created 220 and a pointer to the next record, 230.

Figure 2C:
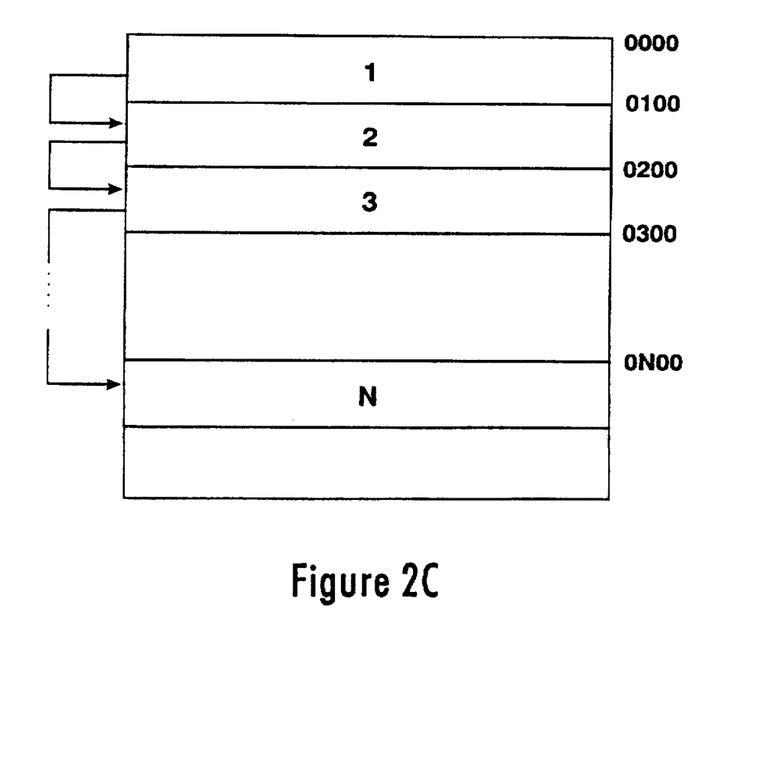
FIG. 2C illustrates a block of memory partitioned into storage areas for nodes of a linked list.

FIG. 2C illustrates a block of memory partitioned into storage area for nodes of a linked list. Each node has a starting address, indicated as a memory offset, in the upper right hand corner of each block shown in FIG. 2C. The arrows pointing from one node to a subsequent node in FIG. 2C represent links between the node and are physically implemented as pointers, such as pointer 230 from FIG. 2A. Thus, the storage block allocated to each node contains a field which contains a pointer to the next record.

Figure 2D:
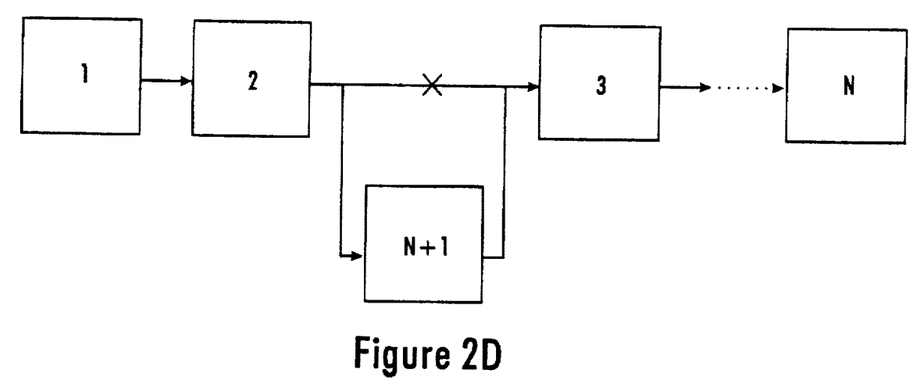
FIG. 2D illustrates insertion of a node into a linked list.

FIG. 2D illustrates a process by which a node is inserted into a linked list. FIG. 2D represents a linked list shown in FIG. 2A except that node N+1 is inserted between nodes 2 and 3 in the linked list. To insert a node in the manner indicated requires that the pointer from node 2 be changed so that it no longer points to node 3 but rather to node N+1. The pointer in node N+1, then, is changed to point to node 3 so that a continuous chain of linkages exists among the nodes.

Figure 2E:
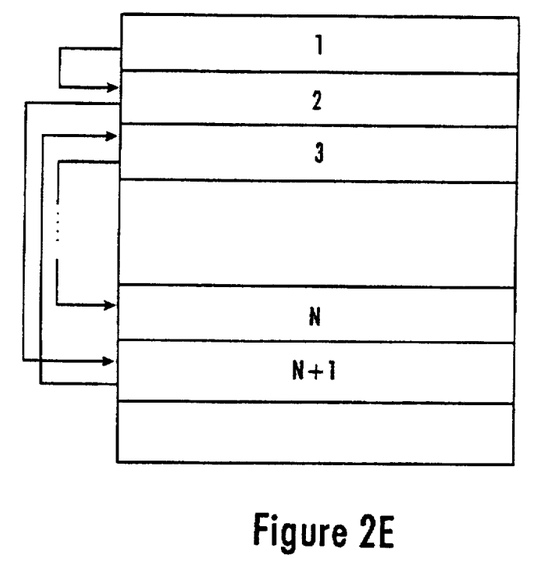
FIG. 2E illustrates memory layout of a single linked list.

FIG. 2E represents a memory block representation of the insertion of a node. Prior to insertion of node N+1 in FIG. 2D, the nodes were consecutively linked so that node 2 pointed to node 3. As shown in FIG. 2E, instead of pointing to node 3 as previously illustrated in FIG. 2C, after the insertion, node 2 points to node N+1 and node N+1 points to node 3.

Figure 3A:
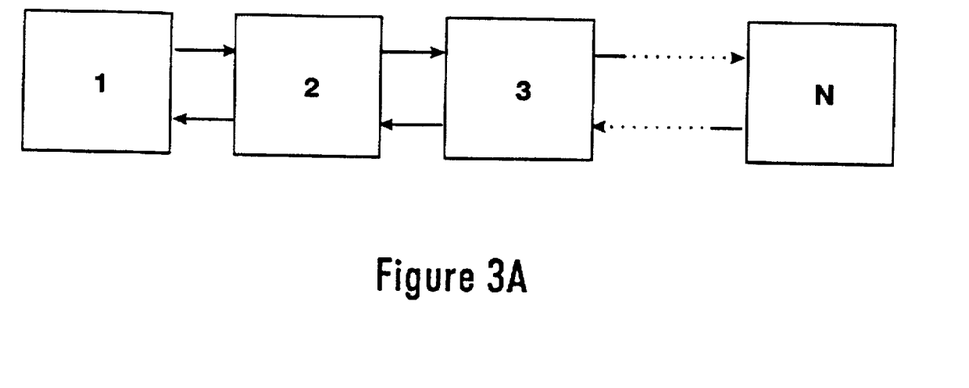
FIG. 3A illustrates a double linked list.
Figure 3B:
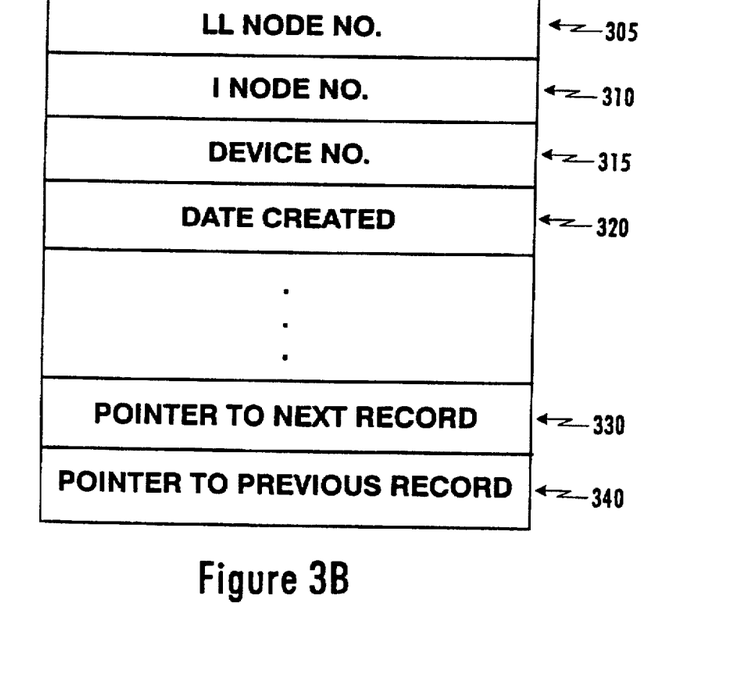
FIG. 3B illustrates a sample data structure for a node of a double linked list.

FIG. 3A illustrates a double linked list. A double linked list is substantially identical to a single linked list except that each node contains a pointer not only to the next record but to the previous record in the list. A sample of a data structure for a node of a double linked list is shown in FIG. 3B. Each of the items shown in FIG. 3B corresponds identically with the dat a structure illustrated in FIG. 2B with the exception of field 340 which contains a pointer to a previous record. Thus, when reading memory in which a particular node is stored, one has immediate reference both to the subsequent node as well as to the previous node. A doubly linked list may or may not be circular, that is, the last node may or may not point to the first node.

Figure 3C:
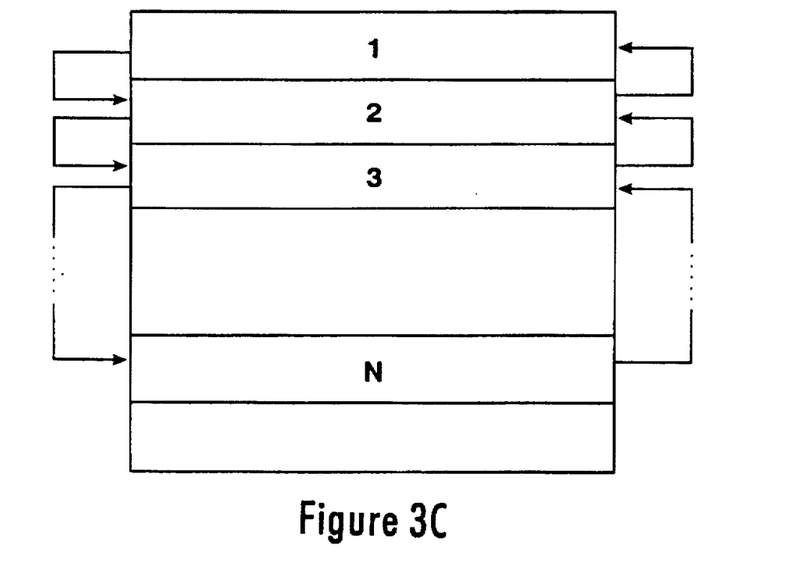
FIG. 3C shows a double linked list in memory.

FIG. 3C shows a double linked list in a memory representation similar to that shown in FIG. 2C.

Figure 4:
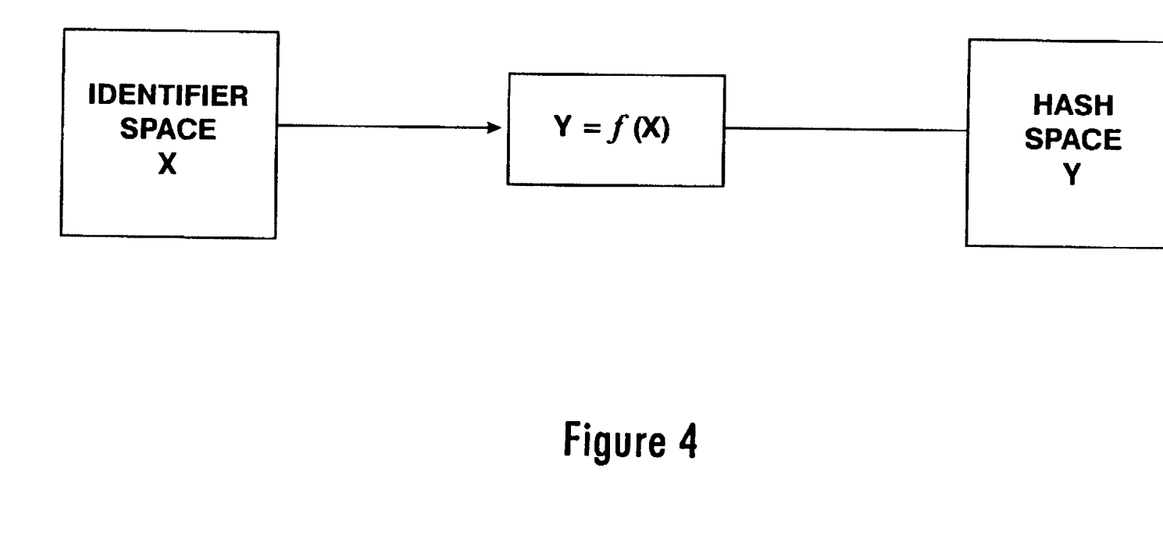
FIG. 4 illustrates the hashing process.

Hashing is sometimes utilized to facilitate storage and retrieval of data. FIG. 4 illustrates the hashing process. A plurality of possible identifiers, at least some of which may need to be stored, constitute an identifier space X. Available memory is partitioned into "buckets" with each bucket having one or more "slots" for storage of data. The buckets available for storage are identified by a set of bucket identifiers Y. Typically, the bucket identifiers are integers. A hashing function f(X) is used to perform an identifier transformation on X. f(X) maps the set of possible identifiers onto the bucket identifiers Y. In a typical programming environment, the identifier space would consist of the set of all legal variable names or file names permitted by the language in question. The number of identifiers in set X actually in use is typically several orders of magnitude less than the total number of possible identifiers. Because the number of buckets is likewise several orders of magnitude less than the total number of possible identifiers, and since one cannot predict in advance which identifiers might be used from the set of possible identifiers, it is possible that two different identifiers will map to the same bucket. Identifiers which map to the same bucket are called synonyms with respect to a hash function f. Distinct synonyms can be entered into the same bucket as long as all of the slots in that bucket have not been used. An overflow occurs when a new identifier is mapped (hashed) by a hashing function into a full bucket.

A hashing function, f, transforms an identifier X into a bucket address. The properties of such a function should be that it is easily computable and that it minimize the number of collisions. In addition, one would like the hash function to be such that it does not result in a biased use of the hash buckets, given random inputs. That is, if $X_i$ is an identifier chosen at random from the identifier space, then one prefers that the probability that $f(X_i)$ equals 1/B for all buckets. Thus, a random identifier has an equal chance of hashing into any of the B buckets. A hash function satisfying this property is called a uniform hash function.

The Problem

Figure 5:
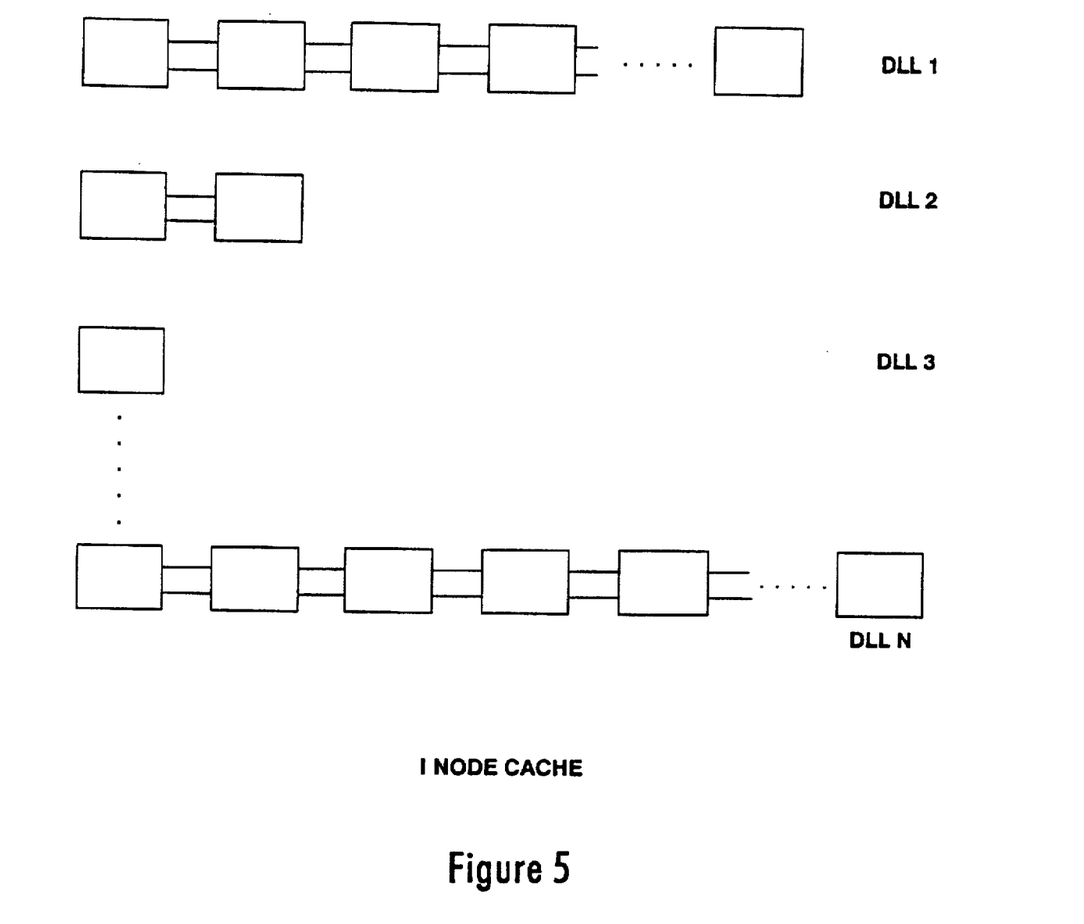
FIG. 5 illustrates an inode cache.

The Solaris® operating system is an implementation of UNIX by Sun Microsystems, Inc. and the name Solaris® is its registered trademark. The Solaris® operating system maintains inodes in an inode cache containing a plurality of linked lists. Each linked list functions substantially as a variable length bucket for the storage of hash functions. Thus, in the example shown in FIG. 5 of an inode cache, a plurality of linked lists DLL1-DLLn store the inodes of files in active use by the operating system. The determination of where to store a particular inode is based on hashing an identifier of the inode (including inode number, device number and perhaps other information) into one of the linked lists of the inode cache. The linked lists of the inode cache are double linked lists. Therefore, in operation, the selection of which linked list to utilize to store a particular inode of a file being activated is determined by hashing the inode identifier to the number of a particular linked list. Once a particular linked list is selected, the inode can be added to the list either at the end or at any point in the list.

Handling of files during the use of the UNIX file system, may require determining whether a duplicate of a particular inode exists in a linked list. If a duplicate inode exists, a system error will result because of the potential for conflicting information. One way of determining whether or not a duplicate inode exists in one of the double linked list of the inode cache, is to take each inode, one at a time, and compare it with every subsequent inode in the list to see if it is a duplicate. This is very expensive in terms of number of machine cycles and ultimately in terms of operating system performance. It is, therefore, desirable to reduce the amount of search time required to determine whether or not a duplicate exists within a double linked list of an inode cache. Thus, it would be desirable to improve the performance of linked list operations by enabling duplicate nodes to be detected in an efficient and rapid manner.

SUMMARY OF THE INVENTION

The present invention provides a system and methods which enable a reduction in the time and cost required to detect duplicates in a linked list. This is achieved by allocating a relatively short block of memory, such as one byte, and by hashing inode identifications to one of the bits of the block of memory. When one desires to check whether or not a linked list already has a duplicate, one hashes the identifier of the inodes of the list, preferably in order, to one of the buckets within the one byte memory block. When the particular bit is known to which the address of the inode hashes, a check of the corresponding bit within the one byte memory block can be made to see if an inode hashing to the same bit location had previously been stored in the list. If it has not been, then there are no potential duplicates and a search of the linked lists to identify duplicates need not occur. If, on the other hand, the corresponding bit and the one byte memory block is 1, then one knows that there is a potential duplicate node in the list and that it proceed the inode being considered. Only under these circumstances it is necessary to compare the identifier of the inode being considered with each of the inodes which proceed in the list to identify a duplicate.

One embodiment of the invention is directed to a computer implemented method for checking for duplicates on a linked list stored on a computer, by checking the linked list for duplicates using a hash bit map containing information about the linked list. This method can be used either to detect whether duplicates exist on a linked list or to detect whether an element to be added to a linked list is a duplicate of one which already exists on the linked list.

In the latter case, checking the linked list for duplicates using a hash bit map is done by: hashing a list element identifier for the list element to be added to the linked list to one bit location of the hash bit map; and checking the bit location to determine whether a possible duplicate exists.

In the former case, checking the linked list for duplicates using a hash bit map is done by: allocating a hash bit map for the linked list and setting all bits in the hash bit map to a first state; sequentially checking each list element of the linked list for possible duplicates, beginning with a first list element, by hashing a list element identifier of a list element being checked to one bit location of said hash bit map; when the bit at the one bit location is in a first state, setting the bit at the one bit location to a second state and checking the next list element; and when the bit at the one bit location is in a second state, comparing the identifier of the list element being checked with the identifier of each preceding list element on the linked list to see if a duplicate exists.

Another embodiment of the invention is directed to apparatus for checking for duplicates in a linked list which has a computer processor with a memory medium containing the linked list; and a computer program for checking the linked list for duplicates using a hash bit map containing information about the linked list. In one embodiment, the linked list is one of plural linked lists constituting an inode cache. The inode cache is preferably part of a Unix file system. The processor may be a processor on a network or a standalone processor.

An embodiment of the invention is also directed to a computer system including: at least one computer and a device configured for checking a linked list for duplicates using a hash bit map containing information about the linked list. The device, in one embodiment is configured for checking a linked list for duplicates using a hash bit map containing information about the linked list and further includes: a device configured for allocating a hash bit map for the linked list and setting all bits in the hash bit map to a first state; a device configured for sequentially checking each element of the linked list for possible duplicates, beginning with a first element, by hashing an element identifier for each element of the linked list to one bit location of the hash bit map; a device configured for, when the bit at the one bit location is in a first state, setting the bit at the one bit location to a second state and checking the next element of the linked list; and a device configured for, when the bit at the one bit location is in a second state, comparing the identifier of the element being checked with the identifier of each preceding element on the linked list to see if a duplicate exists.

In another embodiment, the device is configured for checking a linked list for duplicates using a hash bit map containing information about the linked list using: a device configured for allocating a hash bit map for the linked list and setting all bits in the hash bit map to a first state; a device configured for hashing an element identifier for each element of the linked list to one bit location of the hash bit map and setting a bit at the one bit location to a second state if it is not already in the second state; a device configured for hashing an element identifier of an element to be added to the linked list to one bit location of the hash bit map; a device configured for, when the bit at the one bit location is in a first state, adding the element to the linked list; and a device configured for, when the bit at the one bit location is in a second state, comparing the identifier of the element to be added to the linked list with the identifier of each element on the linked list to determine if a duplicate exists.

An embodiment of the invention is also directed to a product including a computer readable memory medium; at least one linked list stored on the medium, and a hash table, stored on the medium and containing information about the contents of the linked list, which permits a fast search for duplicates on the linked list.

Other embodiments of the invention include a computer program product having a computer readable memory medium; and a computer program stored on the medium for causing a computer to check a linked list for duplicates using a hash bit map containing information about the linked list. In one form, a computer program is stored on the medium for causing a computer to detect duplicates on a linked list as described above. In another, the program is for detecting whether an element to be added to a linked list is a duplicate of an element on the linked list as described above.

In another embodiment, a computer implemented method of checking for duplicate inodes in a Unix File system is implemented by selecting a group of inodes maintained as a linked list; and checking the group of inodes for the existence of duplicates using a hash bit map containing information about the group of inodes selected.

Another embodiment includes a computer implemented method of checking for duplicates on a linked list stored in a computer on a network, by providing an element for performing the step of sending a computer program which checks linked lists for duplicates, using a hash bit map containing information about the linked list, from one computer on the network to the computer where checking for duplicates is to occur, and providing an element for performing the step of executing the computer program at the computer where checking for duplicates is to occur.

Another embodiment includes a method of checking for duplicates on a linked list stored in a computer on a network, by receiving a computer program, which checks a linked list for duplicates using a hash bit map containing information about the linked list, over the network; and executing the computer program.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 6:
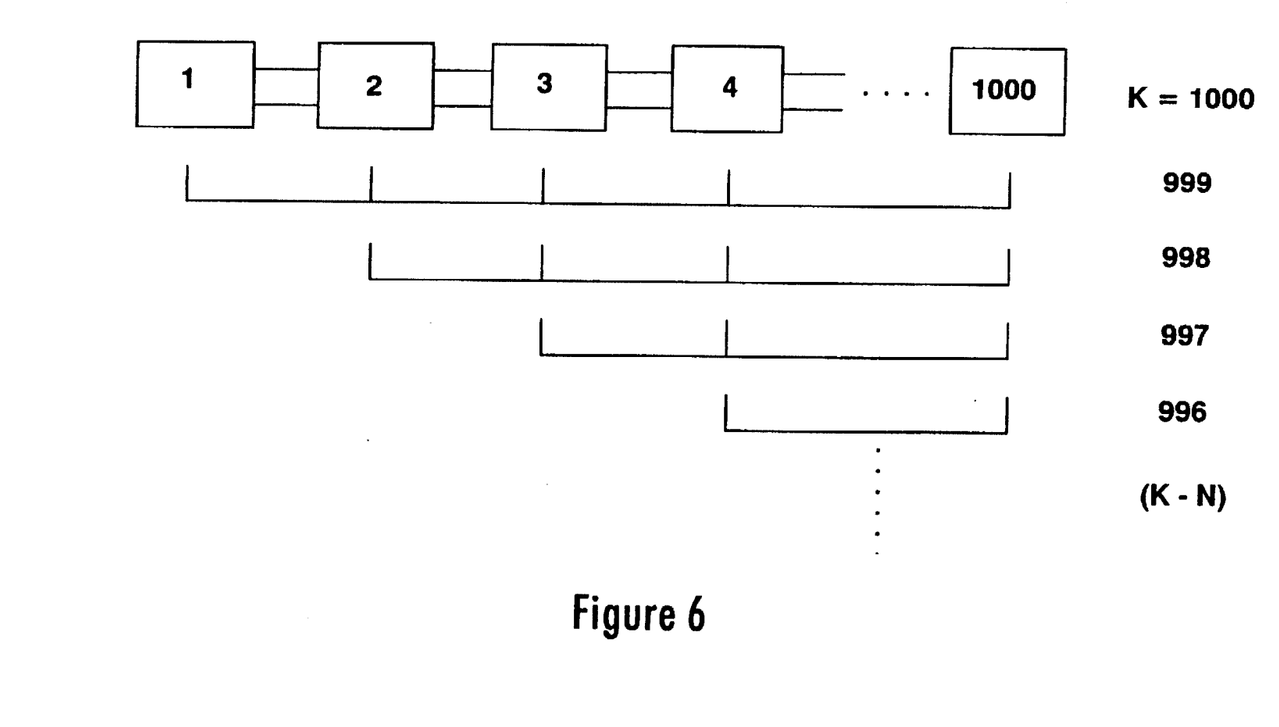
FIG. 6 illustrates a brute force search for duplicates in a linked list.

One way of searching a linked list for duplicates is illustrated in FIG. 6. In this approach, the first element is compared with each of the remaining elements in the list in a first pass. In the example shown this results in 999 comparisons. Then the next element is taken and compared with each subsequent element in the list. This results in 998 comparisons. Then the third element is taken and compared with each subsequent element in the list resulting in 997 comparisons. In general, using this type of brute force approach, the number of comparisons to determine whether or not duplicates exist on a linked list is equal to:

$$N = \sum_{i=1}^{K} (K - i)$$

Thus, it can been seen that a large number of comparisons are required to eliminate the possibility of duplicates from a long linked list. This is computationally very expensive in terms of machine cycles and performance.

Figure 7:
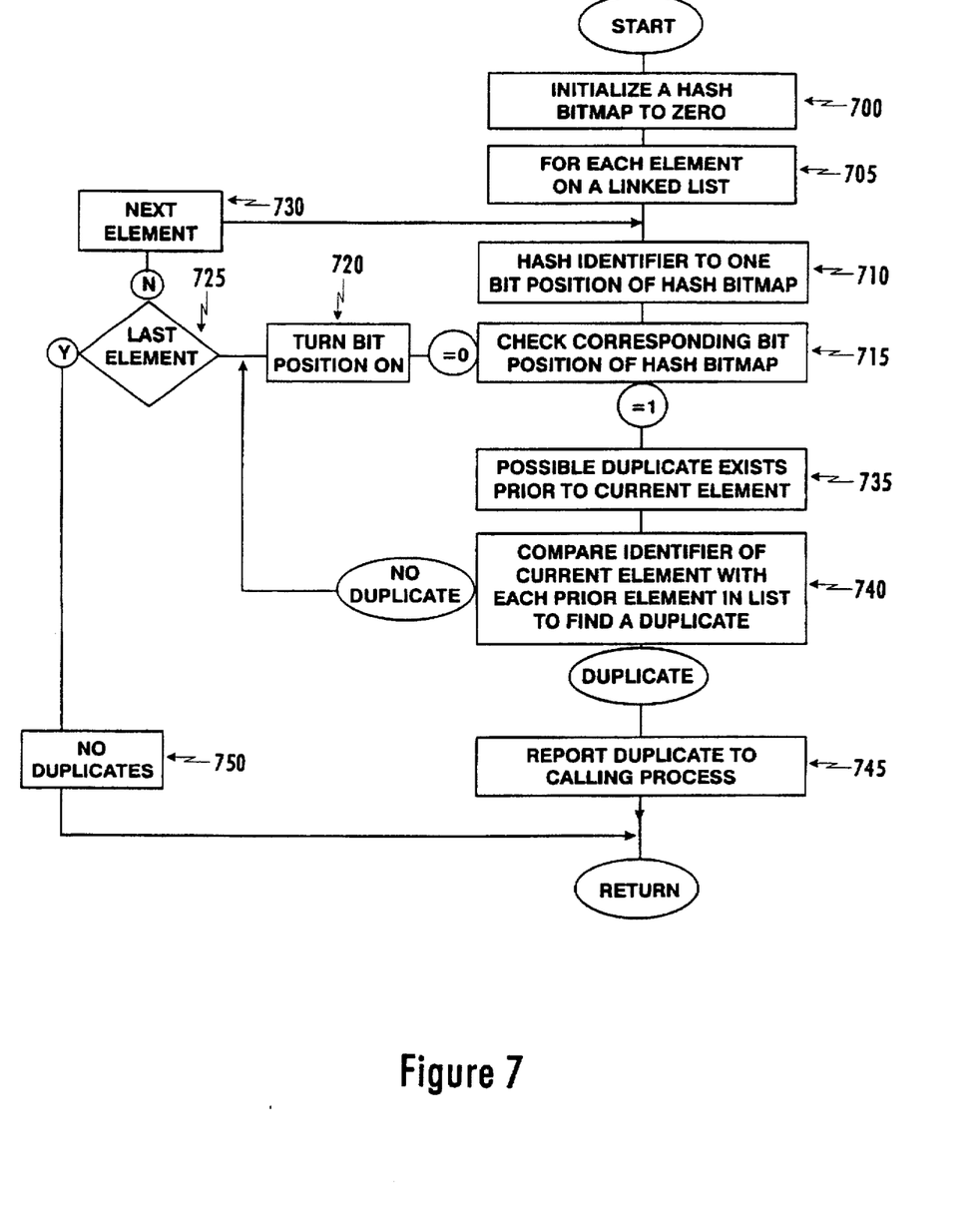
FIG. 7 is a flow chart of an improved method for implementing a search for duplicates in a linked list.

FIG. 7 illustrates an improved method of eliminating duplicates from a linked list in accordance with the invention. Initially, a short block of memory is used as a hash bit map, and is initialized to all zeros (700). The length of the hash bit map is a design decision reflecting the degree of performance improvement needed. The longer the bit map, the fewer collisions will result and as set forth hereinafter the fewer comparisons will be necessary to eliminate the possibility of duplicates. In the best case, only a single pass through the list is required. The particular hash function selected is also a design choice. Many are well known in the art. However, in a preferred embodiment, the hash bit map is one byte in length and the hash function is a modulo 8 division which, in the case of a binary representation results in the last three binary digits of the element identifier specifying the particular bit to be turned on in the hash bit map. Beginning with preferably the first element of a linked list (705) the element identifier is hashed to one bit position of the hash bit map (710). The hash value resulting from the application of the hash function to the identifier of the element being considered will result in a value representing a particular bucket location. That bucket location should be checked to determine whether the value is 0 or 1 (715). If it is 0, the value of the bit is changed to 1 (720) and a test is made to determine whether the element of the list under consideration is the last element (725). If it is not, the next element (730) is considered and the process loops back to block 710. If the bit position of the hash bit map does equal 1, a possible duplicate exists prior to the current element location (735). Only when the hash bit map indicates that a possible duplicate exists, will a comparison occur between the identifier of the current element of the list with each prior element in that list to see if a duplicate can be found. If there is no duplicate, a test is made to determine whether the last element of the list has been reached (725) and, if not, the next element (730) is selected for evaluation. If a duplicate is found, the existence of a duplicate will be reported to the calling process which initiated the search for duplicates, (745). If the last element is reached (725) without identifying a duplicate, there are no duplicates (750) and the process returns.

Figure 8:
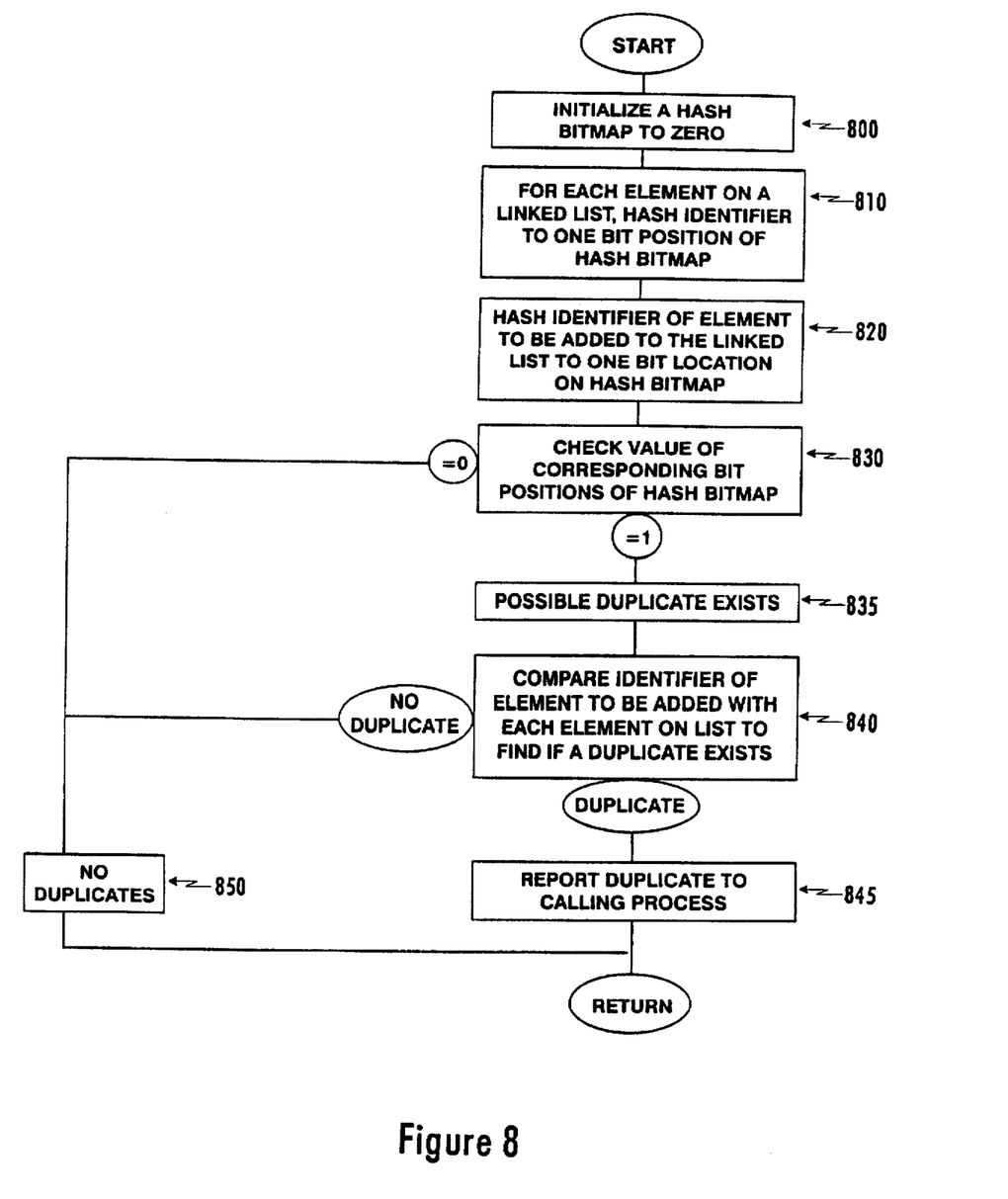
FIG. 8 is a flow chart of a method for checking if an element to be added to a linked list is a duplicate.

FIG. 8 is a flow chart of a method for checking whether an element to be added to a linked list is a duplicate of one already on the list. As before, a hash bit map is initialized to 0 (800) and for each element on a linked list, the identifier for that element is hashed to one bit position of the hash bit map (810). The identifier of an element to be added to the linked list is also hashed to one bit location on the bit map (820) and that location is checked to determine if the value in the bit location is 1 or 0. If it is 0, no possible duplicate exists (850) and the process returns. If the value of the bit position is 1, a possible duplicate exists. Once a possibility of a duplicate is identified, a comparison of the identifier of the element to be added to the list with the identifier of each element on the list is made to find a duplicate (840). If a duplicate is found, that fact is reported to the calling process (845) and the process returns.

Figure 9A:
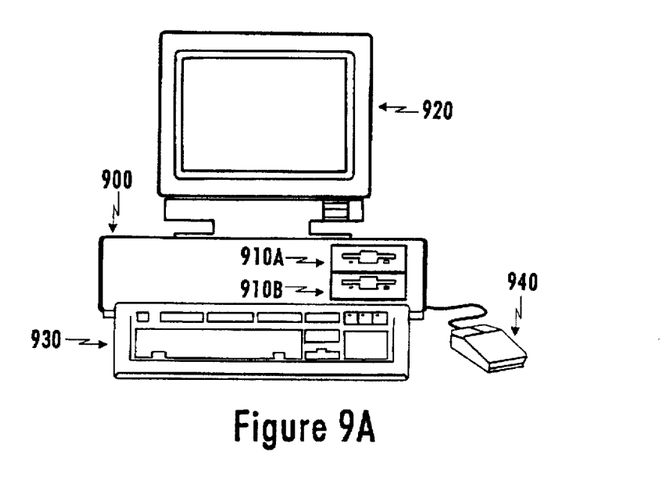
FIG. 9A illustrates a computer of a type suitable for carrying out the invention.

FIG. 9A illustrates a computer of a type suitable for carrying out the invention. Viewed externally in FIG. 9A, a computer system has a central processing unit 900 having disk drives 910A and 910B. Disk drive indications 910A and 910B are merely symbolic of a number of disk drives which might be accommodated by the computer system. Typically, these would include a floppy disk drive such as 910A, a hard disk drive (not shown externally) and a CD ROM drive indicated by slot 910B. The number and type of drives varies, typically, with different computer configurations. The computer has the display 920 upon which information is displayed. A keyboard 930 and a mouse 940 are typically also available as input devices over interface 945. Preferably, the computer illustrated in FIG. 9A is a SPARC workstation from Sun Microsystems, Inc.

Figure 9B:
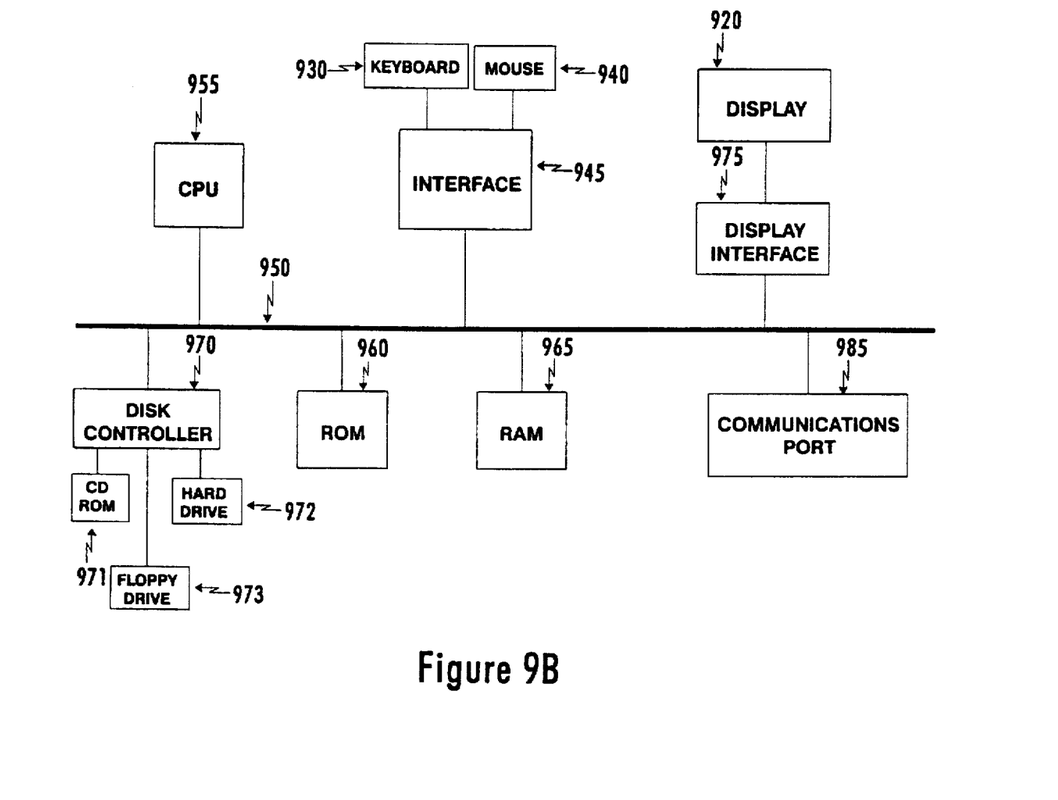
FIG. 9B illustrates a block diagram of the computer of FIG. 9A.

FIG. 9B illustrates a block diagram of the internal hardware of the computer of FIG. 9A. A bus 950 serves as the main information highway interconnecting the other components of the computer. CPU 955 is the central processing unit of the system, performing calculations and logic operations required to execute a program. Read only memory (960) and random access memory (965) constitute the main memory of the computer. Disk controller 970 interfaces one or more disk drives to the system bus 950. These disk drives may be floppy disk drives, such as 973, internal or external hard drives, such as 972 or CD ROM or DVD (Digital Video Disks) drives such as 971. A display interface 975 interfaces display 920 and permits information from the bus to be displayed on the display. Communications with external devices can occur over communications port 985.

Figure 9C:
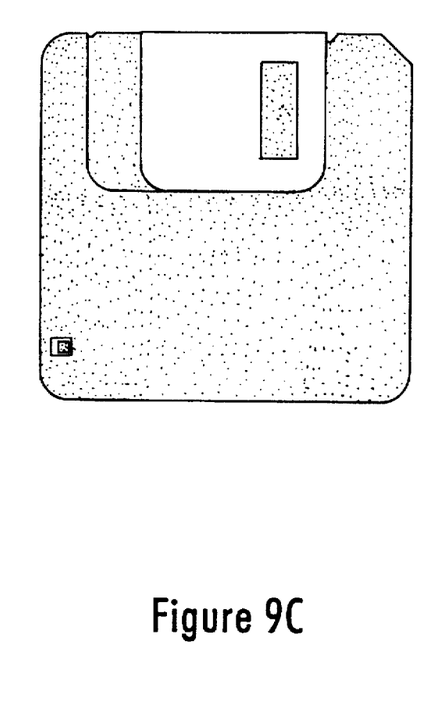
FIG. 9C illustrates a floppy disk containing a program usable with the computer of FIG. 9A.

FIG. 9C illustrates a floppy disk which can be used with floppy disk drives such as 973 in FIG. 9B or 910A in FIG.

9A. Typically, memory media such as a floppy disk, CD ROM, or Digital Video Disk will contain a multi-byte English locale and the program information for controlling the computer to enable the computer to perform its testing and development functions in accordance with the invention.

Thus, using the techniques of the invention disclosed herein, internationalized software can be developed and tested at much lower cost and with greater efficiency than was heretofore possible.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

Thus, in accordance with the invention the effort and cost in terms of machine cycles of searching a linked list for duplicates is considerably reduced.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A computer implemented method for checking for duplicates on a linked list stored on a computer, comprising the step of:

checking said linked list for duplicates using a hash bit map containing information about the linked list.

2. A computer implemented method of claim 1 for detecting duplicates on a linked list, in which the step of checking said linked list for duplicates using a hash bit map containing information about the linked list comprises the steps of:

a. allocating a hash bit map for the linked list and setting all bits in the hash bit map to a first state;
   b. sequentially checking each list element of the linked list for possible duplicates, beginning with a first list element, by hashing a list element identifier of a list element being checked to one bit location of said hash bit map;
   c. when the bit at said one bit location is in a first state, setting the bit at said one bit location to a second state and checking the next list element; and
   d. when the bit at said one bit location is in a second state, comparing the identifier of the list element being checked with the identifier of each preceding list element on the linked list to see if a duplicate exists.

3. The computer implemented method of claim 1 for detecting whether a list element to be added to a linked list is a duplicate of a list element on the linked list, in which the step of checking said linked list for duplicates using a hash bit map containing information about the linked list comprises the steps of:

a. hashing a list element identifier for the list element to be added to the linked list to one bit location of said hash bit map; and
   b. checking said bit location to determine whether a possible duplicate exists.

4. A computer implemented process of claim 3, in which the step of hashing a list element identifier for the list element to be added to the linked list to one bit location of said hash bit map comprises the steps of:

a. allocating a hash bit map for the linked list and setting all bits in the hash bit map to a first state; and
   b. hashing a list element identifier for each list element of the linked list to one bit location of said hash bit map and setting the bit at said one bit location to a second state;

and the step of checking said bit location to determine whether a possible duplicate exists, comprises the steps of:

c. hashing a list element identifier of a list element to be added to the linked list to one bit location of said hash bit map; and
   d. when the bit at said one bit location is in a first state, adding the list element to the linked list; and when the bit at said one bit location is in a second state, comparing the identifier of the list element to be added to the linked list with the identifier of each list element on the linked list to determine if a duplicate exists.

5. Apparatus for checking for duplicates in a linked list comprising:

a computer processor having a memory medium containing said linked list; and
   a computer program for checking said linked list for duplicates using a hash bit map containing information about said linked list.

6. The apparatus of claim 5, in which the linked list is one of plural linked lists constituting an inode cache.

7. The apparatus of claim 6 in which the inode cache is part of a Unix file system.

8. The apparatus of claim 5 in which the processor is a processor on a network.

9. A computer system comprising:

at least one computer; and
   a device configured for checking a linked list for duplicates using a hash bit map containing information about the linked list.

10. The computer system of claim 9 in which, said device configured for checking a linked list for duplicates using a hash bit map containing information about the linked list further comprises:

a. a device configured for allocating a hash bit map for the linked list and setting all bits in the hash bit map to a first state;
   b. a device configured for sequentially checking each element of the linked list for possible duplicates, beginning with a first element, by hashing an element identifier for each element of the linked list to one bit location of said hash bit map;
   c. a device configured for, when the bit at said one bit location is in a first state, setting the bit at said one bit location to a second state and checking the next element of the linked list; and
   d. a device configured for, when the bit at said one bit location is in a second state, comparing the identifier of the element being checked with the identifier of each preceding element on the linked list to see if a duplicate exists.

11. The computer system of claim 9 in which, said device configured for checking a linked list for duplicates using a hash bit map containing information about the linked list further comprises:

a. a device configured for allocating a hash bit map for the linked list and setting all bits in the hash bit map to a first state;
   b. a device configured for hashing an element identifier for each element of the linked list to one bit location of said hash bit map and setting a bit at said one bit location to a second state if it is not already in the second state;

c. a device configured for hashing an element identifier of an element to be added to the linked list to one bit location of said hash bit map;

d. a device configured for, when the bit at said one bit location is in a first state, adding the element to the linked list; and e. a device configured for, when the bit at said one bit location is in a second state, comparing the identifier of the element to be added to the linked list with the identifier of each element on the linked list to determine if a duplicate exists.

12. A product comprising:

a computer readable memory medium;

at least one linked list stored on said medium; and a hash table, stored on said medium and containing information about the contents of the linked list, which permits a fast search for duplicates on the linked list.

13. A computer program product comprising:

a computer readable memory medium; and a computer program stored on said medium for causing a computer to check a linked list for duplicates using a hash bit map containing information about the linked list.

14. A computer program product of claim 13 in which the computer program stored on said medium for causing a computer to check a linked list for duplicates using a hash bit map containing information about the linked list is a program for causing a computer to detect duplicates on a linked list, by:

a. allocating a hash bit map for the linked list and setting all bits in the hash bit map to a first state;

b. sequentially checking each element of the linked list for possible duplicates, beginning with a first element by hashing an element identifier for each element of the linked list to one bit location of said hash bit map;

c. when the bit at said one bit location is in a first state, setting the bit at said one bit location to a second state and checking the next element; and d. when the bit at said one bit location is in a second state, comparing the identifier of the element being checked with the identifier of each preceding element on the linked list to see if a duplicate exists.

15. A computer program product of claim 13 in which the a computer program stored on said medium for causing a computer to check a linked list for duplicates using a hash bit map containing information about the linked list is a program for detecting whether an element to be added to a linked list is a duplicate of an element on the linked list by:

a. allocating a hash bit map for the linked list and setting all bits in the hash bit map to a first state;

b. hashing an element identifier for each element of the linked list to one bit location of said hash bit map and setting the bit at said one bit location to a second state c. hashing an element identifier of an element to be added to the linked list to one bit location of said hash bit map;

d. when the bit at said one bit location is in a first state, adding the element to the linked list; and e. when the bit at said one bit location is in a second state, comparing the identifier of the element to be added to the linked list with the identifier of each element on the linked list to determine if a duplicate exists.

16. A computer implemented method of checking for duplicate modes in a Unix File system, comprising the steps of:

a. selecting a group of inodes maintained as a linked list; and b. checking said group of inodes for the existence of duplicates using a hash bit map containing information about the group of inodes selected.

17. The method of claim 16, comprising the additional step of:

c. repeating steps a. and b. until all groups of inodes maintained as linked lists have been checked.

18. A computer implemented method of checking for duplicates on a linked list stored in a computer on a network, comprising the steps of:

a. sending a computer program which checks linked lists for duplicates, using a hash bit map containing information about the linked list, from one computer on the network to the computer where checking for duplicates is to occur; and b. executing said computer program at the computer where checking for duplicates is to occur.

19. A method of checking for duplicates on a linked list stored in a computer on a network, comprising the steps of:

a. receiving a computer program, which checks a linked list for duplicates using a hash bit map containing information about the linked list, over the network; and b. executing said computer program.

* * * * *

UNITED STATES PATENT AND TRADEMARK OFFICE
CERTIFICATE OF CORRECTION

PATENT NO. : 5,765,165
DATED : June 9, 1998
INVENTOR(S) : James HARPER

It is certified that error appears in the above-indentified patent and that said Letters Patent is hereby corrected as shown below:

In the Claims, Column 12, Line 18, change "modes" to --inodes--.

Signed and Sealed this

Twenty-sixth Day of January, 1999

Attest:

Attesting Officer

*Acting Commissioner of Patents and Trademarks*